(12) United States Patent
Krautwurst et al.

(10) Patent No.: US 9,931,680 B2
(45) Date of Patent: Apr. 3, 2018

(54) METHOD FOR OPERATING A STECKEL MILL

(71) Applicant: SIEMENS AKTIENGESELLSCHAFT, Munich (DE)

(72) Inventors: Dirk Krautwurst, Erlangen (DE); Matthias Kurz, Erlangen (DE); Birger Schmidt, Brand-Erbisdorf (DE)

(73) Assignee: PRIMETALS TECHNOLOGIES GERMANY GMBH, Erlangen (DE)

( * ) Notice: Subject to any disclaimer, the term of this patent is extended or adjusted under 35 U.S.C. 154(b) by 727 days.

(21) Appl. No.: 14/411,624

(22) PCT Filed: May 22, 2013

(86) PCT No.: PCT/EP2013/060441
§ 371 (c)(1),
(2) Date: Dec. 29, 2014

(87) PCT Pub. No.: WO2014/000979
PCT Pub. Date: Jan. 3, 2014

(65) Prior Publication Data
US 2015/0174628 A1    Jun. 25, 2015

(30) Foreign Application Priority Data
Jun. 29, 2012   (EP) ...................................... 12174352

(51) Int. Cl.
*B21B 37/68*   (2006.01)
*B21B 37/16*   (2006.01)
(Continued)

(52) U.S. Cl.
CPC ............. *B21B 37/165* (2013.01); *B21B 1/34* (2013.01); *B21B 37/72* (2013.01); *B21B 38/04* (2013.01);
(Continued)

(58) Field of Classification Search
CPC .................................................... G05B 19/182
(Continued)

(56) References Cited

U.S. PATENT DOCUMENTS

| 5,771,732 A | 6/1998 | Krämer et al. |
| 5,996,384 A * | 12/1999 | Steeper ................... B21B 37/68 348/88 |
| 8,919,162 B2 * | 12/2014 | Moretto .................. B21B 37/68 72/11.1 |

FOREIGN PATENT DOCUMENTS

| DE | 19514475 | 10/1996 |
| EP | 12174352 | 6/2012 |

(Continued)

OTHER PUBLICATIONS

Stephan Kramer et al., "Technology and performance of modern Steckel mills," Iron and Steel Engineer, Jul. 1997, pp. 17-26.
(Continued)

*Primary Examiner* — David B Jones
(74) *Attorney, Agent, or Firm* — Staas & Halsey LLP

(57) ABSTRACT

A Steckel mill has a reversing unit for rolling a rolled product and winding furnaces arranged on the entrance side and exit side of the reversing unit. When rolling the rolled product in a region of a head of the rolled product, a target thickness of the rolled product is ignored, while measuring a current thickness and/or a hardness of the rolled product and comparing this with a setpoint value. One the measured variable reaches or is below the setpoint value, the reversing unit is operated with a view to achieving the target thickness of the rolled product. The Steckel mill is operated to allow for rolling of a cold, non-rollable piece of the rolled product, so that malfunctions are avoided and the usable part of the rolled product is as large as possible.

18 Claims, 1 Drawing Sheet

(51) Int. Cl.
- *B21B 1/34* (2006.01)
- *B21B 37/72* (2006.01)
- *B21B 38/04* (2006.01)
- *B21B 45/00* (2006.01)
- *G05B 19/18* (2006.01)
- *B21B 37/18* (2006.01)
- *B21B 37/58* (2006.01)

(52) U.S. Cl.
CPC .......... *B21B 45/004* (2013.01); *G05B 19/182* (2013.01); *B21B 37/16* (2013.01); *B21B 37/18* (2013.01); *B21B 37/58* (2013.01); *B21B 2273/14* (2013.01); *B21B 2273/16* (2013.01)

(58) Field of Classification Search
USPC ........................................................ 72/12.7
See application file for complete search history.

(56) References Cited

FOREIGN PATENT DOCUMENTS

| | | |
|---|---|---|
| JP | 59-191502 | 10/1984 |
| WO | PCT/EP2013/060441 | 5/2013 |

OTHER PUBLICATIONS

European Office Action for European Priority Application No. 12174352.0, dated Nov. 15, 2012, 7 pages.

English language International Search Report for PCT/EP2013/060441, dated Jun. 28, 2013, 2 pages.

\* cited by examiner

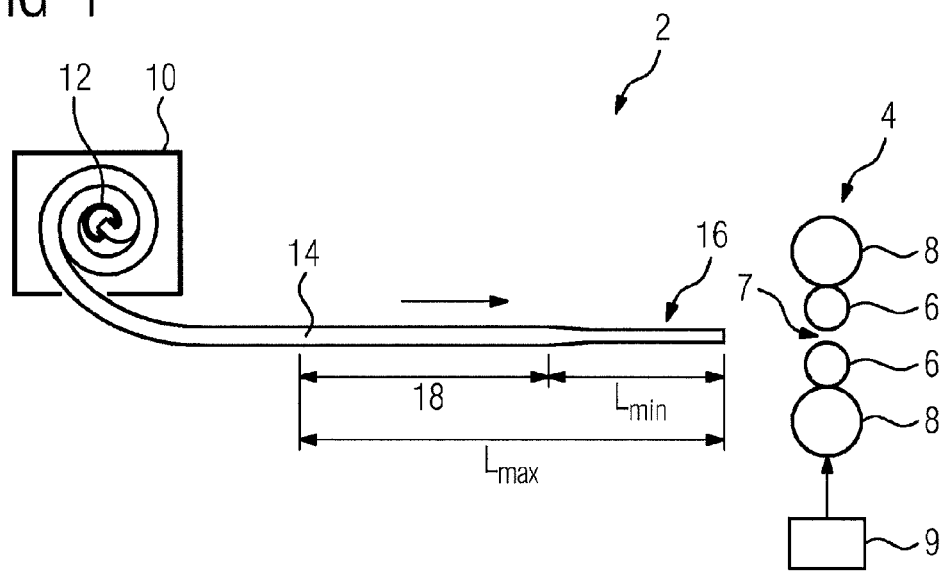
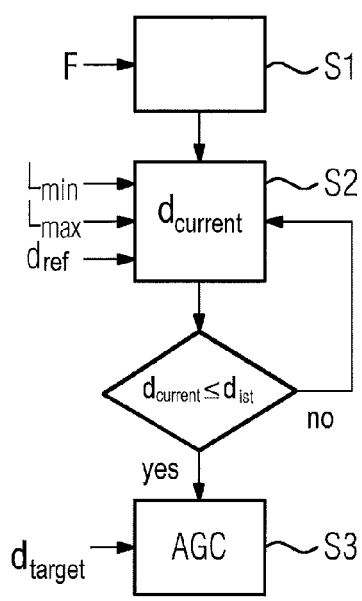

METHOD FOR OPERATING A STECKEL MILL

CROSS REFERENCE TO RELATED APPLICATIONS

This application is based on and hereby claims priority to International Application No. PCT/EP2013/060441 filed on May 22, 2013 and European Application No. 12174352.0 filed on Jun. 29, 2012, the contents of which are hereby incorporated by reference.

BACKGROUND

The invention relates to a method for operating a Steckel mill having at least one reversing unit for rolling a rolled product and winding furnaces for the rolled product arranged on the entry side and the exit side with respect to the reversing unit. The invention also relates to an open-loop and/or closed-loop control device for carrying out the method, a Steckel mill with an open-loop and/or closed-loop control device of this type, a machine-readable program code and a storage medium.

In a Steckel mill, a rolled product, in particular a strip, is fed out from an entry-side winding furnace and is fed by an entry-side driver into a reversing unit for the initial pass. Following the first rolling pass, the rolled product is fed into an exit-side winding furnace. During this type of reversing process which is repeated multiple times, a head end and a foot end of the strip become more severely cooled than the central region of the strip. The stronger cooling results therefrom that, during the reversing process, in alternating manner, these strip regions are not kept at a high temperature in the winding furnace.

Due to the cold head end and the cold foot end of the rolled product or strip, the rolling force greatly increases there during the rolling pass relative to the central region of the strip. The reversing unit must therefore be designed for the high rolling forces that arise here. Due to the extreme rolling force spikes at the head and foot end of the rolled product, changes of thickness and/or flatness over the strip length can occur. As a result, the rolled product has a reduced quality. When a fault arises, caused by excessive cooling of the rolled product, the whole material is usually coiled up as scrap.

According to DE 19514475, this problem is counteracted in that heating devices are provided between the reversing unit and the winding furnaces, so that, above all, the part of the rolled product situated outside the heated winding furnaces can be brought to a temperature that is suitably adjusted to the remaining rolled product. However, this solution is characterized by a very high energy usage, whilst sufficient space is also required for the heating devices.

SUMMARY

It is one possible object to operate a Steckel mill with open-loop or closed-loop control in such a way that, following a fault and one or more subsequent rolling processes, the quality of the largest possible part of the rolled product remains as high as possible.

The inventors propose a method for operating a Steckel mill having at least one reversing unit for rolling a rolled product and winding furnaces for the rolled product on the entry side and the exit side with respect to the reversing unit, comprising the following:

1. during rolling of the rolled product in the region of a head end of the rolled product, a target thickness of the rolled product is ignored,
2. while 1 is carried out, at least one measured variable which correlates to a current thickness and/or a hardness of the rolled product is determined and is compared with a reference value,
3. if the determined measured variable reaches or falls below the reference value, the reversing unit is operated with the aim of achieving the target thickness of the rolled product.

In the above-described method, allowance is made in the rolling process for a cold, non-rollable section of the rolled product and the open-loop or closed-loop control of the reversing unit is adapted accordingly so that faults are prevented and the usable part of the rolled product is as large as possible. In contrast to the related art, the method does not aim for the elimination of the cold section in the region of the head or foot end of the rolled product, but toward minimizing the length and the influence of said cold section during the rolling process. The method is based on the concept that the cold section can be automatically detected and the closed-loop control of the reversing unit can be automatically adapted accordingly.

For this purpose, particularly in the region of the head end of the rolled product, in particular during feeding of the rolled product into the reversing unit, at the start of the rolling process, typical closed-loop control to a target thickness of the rolled product is dispensed with. In (1), the reversing unit is open-loop or closed-loop controlled so that an elastic deformation and/or a plastic forming of the material takes place, leading to a rolling force level which results in reliable feeding of the material in the rolling gap while simultaneously achieving an acceptable degree of flatness of the rolled product.

While carrying out (1), at least one measured variable which correlates to a current thickness and/or a hardness of the rolled product is measured. The measured variable can also be the current thickness or hardness of the rolled product itself. Thus, a direct and/or indirect determination of the thickness or harness of the rolled product is carried out. Other variables which correlate to the thickness or hardness are, for example, a rolling force or an adjustment of the roll gap. The principle applies herein that the hotter the rolled section is, the softer the material is or the greater is the reduction in the thickness during rolling. For example, in the determination of the thickness and/or hardness, the setting of the roll gap is taken into account since the roll gap can change due to a thickness or hardness changing during the rolling process.

The thickness or hardness determined or the roll gap setting is compared with a pre-determined reference value. If the determined measured variable reaches or falls below the reference value, switching over to the closed-loop control for material removal that is typical during the hot rolling of metallic rolled products takes place automatically and the still hot part of the rolled product can be rolled undisturbed to the target thickness. A person skilled in the art would know a variety of methods that are suitable for achieving a target thickness, e.g.

- an Automatic Gauge Control (AGC) algorithm with or without thickness monitoring during rolling;
- (multi)setpoint regulation, wherein from the hardness of the material, a force is calculated that is needed in order to achieve the target thickness and the roll gap setting is made accordingly;

or feed-forward (AGC) regulation with or without thickness monitoring, in which information is taken into account in the AGC algorithm concerning thickness deviations at previously rolled sites of the rolled product.

In that initially the target thickness of the strip in the region of the cold section during feeding of the rolled product through the roll gap is ignored and only subsequently is the closed-loop control set to target thickness, the head end and the foot end of the rolled product are generally rolled to a greater thickness than the target thickness (smaller thickness reduction). However, these regions remain flat and the rolling process is not disrupted. The thicker ends of the rolled product can be cut off after completion of the rolling process, so that only the part which has the desired target thickness is sold. The material removed at the ends of the rolled product is a very small proportion compared with the total length of the rolled product, so that the majority of the rolled product is rolled to a high quality.

Preferably, in 1, the reversing unit is set to a force regulation with a pre-determined force pattern. The expression force pattern should be understood herein to include a constant force pattern, i.e. a merely constant force can be pre-set. Alternatively, the force pattern can be a pre-determined force which varies over time. Suitably, the pre-determined force pattern comprises a constant force which lies between 5 MN and 100 MN, in particular, between 5 MN and 60 MN. The force is selected such that, firstly, it permits unambiguous detection of the material in the roll gap of the reversing unit but, secondly, such that overloading of the reversing unit is prevented. Once the material has been detected in the roll gap, the setting is controlled by the force regulation such that the reversing unit is always loaded, for example, with the same force (methods for force regulation with pre-determined force are known to persons skilled in the art).

Alternatively, in 1, the reversing unit is set to a force regulation in which a reference force is determined for the reversing unit, based on the at least one determined measured variable. This means that, during the execution of 1, the reversing unit is regulated for force and that the determined measured variable which relates back directly or indirectly to the thickness of the rolled product or to the hardness thereof, is used during force-regulated operation of the reversing unit. The force pattern is not determined and pre-set in advance, but rather a, particularly continuous, adaptation of the force takes place in real time, depending on the local properties of the section of the rolled product that is currently situated in the roll gap. For example, this closed-loop control of the reversing unit can act like a spring or an elastic band tensioned round the working rolls of the reversing unit—when a raised force acts on the working rolls, for example, because at this point the material of the rolled product is harder, the roll gap would open wider, although this automatically increases the force which presses the working rolls together and thus closes the setting again.

According to a preferred variant, an expected minimum length of a cold section of the rolled product is pre-determined and, during rolling of a section of the rolled product in the region of the minimum length, only 1 is carried out. This means that, for as long as rolling is carried out in the region of the expected minimum length, no determination of the current thickness of the rolled section takes place, but rather the reversing unit is regulated, in particular, for a force. In this way, a more rapid and more reliable operation of the Steckel mill takes place, since in the region of the minimum length of the cold section, switching over from force regulation to thickness regulation is counterproductive and is therefore not provided. It is therefore not necessary at this stage of the rolling process to determine the current thickness of the rolled section. Following the passage of the region of the minimum length, at least 2 is carried out, and possibly also 3 when the reference value is reached.

According to a further preferred variant, an expected maximum length of the cold section of the rolled product is pre-determined, wherein a transition region exists between the minimum length and the maximum length and wherein only during rolling of the section of the rolled product in the transition region, 2 and 3 are carried out. It is thus ensured that the transition to thickness regulation takes place as soon as possible.

Since the actual length of the cold section is not known, both the minimum length and the maximum length are estimated on the basis of the material geometry (length, thickness of the rolled product) and the spacings of the winding furnaces from the reversing unit. It can occur that even after passage of the expected maximum length for the cold section, the reference value of the measured variable is still not achieved. In this event, switching over to closed-loop control for the target thickness takes place automatically. Even if the reference value is not reached, after the expected maximum length of the cold section, the measured variable will have approximated to the reference value, so that damage to the reversing unit on adjustment of the roll gap for the usual thickness regulation is unlikely.

Preferably, the thickness of the rolled section of the rolled product is calculated during 2 by the measured rolling force and by a measured setting of the roll gap of the reversing unit. The thickness of the rolled product is not measured directly, but rather the so-called gaugemeter thickness is calculated by the rolling force set and the previously measurable stand stiffness values.

If, during rolling, the cold foot end is introduced into the reversing unit, a similar process is carried out. According to a preferred variant, for rolling of the cold section at the foot end of the rolled product, the reversing unit is switched over from the closed-loop control for the target thickness to a closed-loop control in which the target thickness is ignored. In particular, during rolling, an actual rolling force is compared with a reference force and if the actual force exceeds the reference force (i.e. when the cold section has been reached), an open-loop and/or closed-loop control device associated with the reversing unit is switched, in particular, to force regulation. In this way, until the feeding out, contact with the material of the rolled product is maintained. Alternatively or in addition, a minimum length and a maximum length are pre-determined for the cold section.

The force or the force pattern for the force regulation and the expected length of the cold section can be the same as during feeding in. Alternatively, they can also be determined anew.

The length of the cold section can correspond, in particular, to the expected maximum length of the cold section on feeding in during a previous rolling pass or during the previous rolling process. The length of the cold section is at least as long as the minimum length during feeding in. Suitably, it is taken into account by a process computer, at the head end during feeding in, at what length the switch-over to target thickness regulation takes place. This length is then used to define the cold section in the region of the foot end of the rolled product.

Preferably, the minimum length is between 0 m and 5 m. The minimum length is 0 m, for example, at the start of the rolling process when the ends of the rolled product have not yet cooled. In this case, the relevant initial pass at the start, in particular, is force regulated, although the same procedure is used in the transition region of the rolled product and the thickness of the rolled section is determined from the start and is compared with the reference value with a view to the earliest possible switch-over to target thickness regulation. If the material has already been rolled once and pulled back out of the roll gap, the material at the head end could already have reached the target thickness, after which comes thicker material which can also be cold. In order to suppress excessively early switching over of the closed-loop control in this event, the minimum length is pre-determined such that it covers the critical cold section and, in this case, the minimum length is, in particular, up to 5 m. In other cases, the minimum length would be defined smaller, in particular up to 1 m, in order to suppress problems during feeding in.

Preferably, the maximum length is approximately 10 m. The maximum length advantageously corresponds to the separation between the reversing unit and one of the winding furnaces.

According to a further preferred variant, 1 to 3 are only initiated following a fault in the rolling process during closed-loop control of the reversing unit to a target thickness. The material could already have undergone the initial pass, but in the event of the fault has been withdrawn from the roll gap again. In particular, the open-loop and/or closed-loop control device determines the dimensions of the previously rolled material at the time point of the fault. If, during rectification of the fault, material is removed, the inputs to the reversing unit regarding the length of the rolled product are to be corrected.

The inventors also propose an open-loop and/or closed-loop control device for a Steckel mill with a machine-readable program code which has control instructions which, on execution of the program code, cause the open-loop and/or closed-loop control device to carry out a method according to one of the embodiments described above.

The Steckel mill may have at least one reversing unit for rolling a rolled product and winding furnaces for the rolled product arranged on the entry side and the exit side with respect to the reversing unit, and having an open-loop and/or closed-loop control device of this type.

A machine-readable program code may be used for an open-loop and/or closed-loop control device for a Steckel mill, wherein the program code has control instructions which cause the open-loop and/or closed-loop control device to carry out the method according to one of the embodiments described above.

A storage medium with a machine-readable program code of this type stored thereon.

In summary, during rolling by the Steckel mill, account is taken of the cold non-rollable section of the rolled product and the Steckel mill is controlled differently in the region of the cold section and outside this region. By this means, other elements of the automation which are based on the rolling force signal, for example, material tracking can be reliably carried out during automatic operation. In the region of the cold section, the material of the rolled product is guided into the roll gap, in particular, without any decrease in thickness necessarily occurring. Outside of the cold section, the usual closed-loop control of the reversing unit for thickness reduction is set in order to achieve the target thickness.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a schematic representation of a Steckel mill for rolling a metal strip, and FIG. 2 is a block flow diagram showing the sequence of the operating method for a Steckel mill of this type.

The same reference signs have the same meaning in the different figures.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The Steckel mill 2 shown in FIG. 1 comprises a reversing unit 4 with two working rolls 6 between which a roll gap 7 is formed, and two backup rolls 8, as well as winding furnaces arranged on the entry side and the exit side with respect to the reversing unit 4, of which, however in FIG. 1, only the entry-side winding furnace 10 is shown. The Steckel mill 2, in particular the reversing unit 4, is controlled by an open-loop and/or closed-loop control device 9 which is shown symbolically in FIG. 1.

Arranged in the winding furnace 10 is a rolled product 14 to be rolled, a metal strip in the exemplary embodiment shown, wound on a Steckel drum 12. In the winding furnace 10, the rolled strip 14 is kept hot so that it can be rolled by the reversing unit 4 to a target thickness $d_{target}$.

A general problem with a Steckel mill 2 of this type is that even after short delays, the material outside the winding furnaces 10 is so cold that it can no longer be rolled to a target thickness of $d_{target}$. In order to solve this problem, the operating method shown schematically in FIG. 2 is provided for the Steckel mill 2.

According to the operating method shown schematically in FIG. 2, in S1, in the region of a cold head end 16 of the strip 14, the reversing unit 4 is initially regulated such that contact between the working roll 6 and the metal strip 4 takes place, but no substantial reduction in thickness takes place. In particular, for this purpose, a constant rolling force is pre-set which is selected such that detection of the rolled strip 14 in the roll gap 7 between the working rolls 6 is possible, but the force F must not be too great such that the reversing unit 2 is damaged by the cold and therefore harder section in the region of the head end 16 of the rolled strip 14.

In S2, during the force-regulated rolling process, a current actual thickness $d_{current}$ of the rolled section of the rolled strip 14 is determined. For this purpose, in the exemplary embodiment shown, a minimum length $L_{min}$ and a maximum length $L_{max}$ of the cold section of the rolled strip 14 are pre-determined. The minimum length $L_{min}$ varies, in particular, between 0 and 5 m, and in the exemplary embodiment shown, it is 1 m. The maximum length $L_{max}$ corresponds, for example, to the separation between the reversing unit 2 and the entry-side winding furnace 10, while allowing a safety margin. The maximum length $L_{max}$ is, for example, 10 m.

During rolling of the section of the strip 14 in the region of the minimum length $L_{min}$, in the exemplary embodiment shown, the reversing unit 4 is regulated solely for force.

Only after the passage of the region of minimum length $L_{min}$ is it to be expected that the rolled strip 14 is hot enough to be rolled to the target thickness $d_{target}$. However, it is not known where the cold section at the head end 16 of the rolled strip 14 finishes. For this reason, in a transition region 18 after the minimum length $L_{min}$ but within the maximum length $L_{max}$, during rolling of the metal strip 14, the current thickness $d_{current}$ is determined, particularly continuously, and is compared with a pre-determined reference thickness $d_{ref}$. Determination of the current thickness $d_{current}$ takes place, in particular, by the rolling force F and the size of the roll gap 7 between the working rolls 6. The current thickness $d_{current}$ is therefore determined indirectly. Alternatively, it can also be measured directly. In place of the current thickness $d_{current}$, the hardness of the strip 14 can also be determined directly or indirectly. Suitable measured variables for determination of the current thickness $d_{current}$ or the hardness are, for example, the rolling force F and a setting of the roll gap 7.

If the determined thickness $d_{current}$ is smaller than or equal to a reference thickness $d_{ref}$, in accordance with S3, the operating method is initiated wherein switching over takes place from the force regulation to a thickness regulation of the reversing unit 4. The roll gap 7 is adjusted such that the rolled strip 14 is rolled to the pre-determined target thickness $d_{target}$.

A force regulation in accordance with S1 can already be set during the first pass. Alternatively, the method shown in FIG. 2 is only initiated once, following a plurality of rolling passes, the ends of the rolled strip 14 have already cooled down or when a fault has occurred during reversing.

When the foot end of the strip 14 has reached the reversing unit 4, a similar procedure is followed as in the region of the head end 16. In this process, an actual rolling force is compared with a reference force and, if the actual rolling force exceeds the reference force, i.e. if the foot end is too cold to be rolled to the desired target thickness $d_{target}$, switching over to force regulation in accordance with S1 again takes place. Similarly as for the head end 16, in the region of the foot end, a minimum length $L_{min}$, a maximum length $L_{max}$ and a transition region 18 for the cold section can be provided.

As an alternative to the comparison of the determined current thickness $d_{current}$ with the reference value $d_{ref}$, a thickness deviation or thickness difference which is determined when the hot section of the rolled product 14 reaches the roll gap 7 can be compared with a pre-determined reference value and, on exceeding this reference value, i.e. if the thickness deviation is too great, switching over from force regulation to the "normal" roll gap monitoring takes place.

The method described above for operation of the Steckel mill 2 is based on automated recognition of the transition from the non-rollable to the rollable material section. If, during force regulation wherein the target thickness $d_{target}$ is ignored, the current thickness $d_{current}$ of the rolled product 14 falls below the pre-determined reference thickness $d_{ref}$, switching over to the normal, thickness-regulated rolling operation (e.g. AGC) takes place. The method is also suitable for automatic tapering in order to achieve thin dimensions. For this purpose, the head end and the foot end become so cold that, on certain occasions, they can no longer be rolled to the target thickness, whilst the head and foot lengths and thicknesses are set such that the largest possible portion of the rolled product 14 is optimally utilized in a fault-free operation of the Steckel mill 2.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for operating a Steckel mill having a reversing unit for rolling a rolled product, the Steckel mill having winding furnaces for the rolled product, the winding furnaces including an entry-side winding furnace arranged at an entry side of the reversing unit, and an exit-side winding furnace arranged at an exit side of the reversing unit, the method comprising:

during rolling of the rolled product in the reversing unit, in a region of a head end of the rolled product, ignoring a target thickness of the rolled product;

while rolling the rolled product and ignoring the target thickness, determining a measured variable which correlates to at least one of a current thickness and a current hardness of the rolled product, the measured variable being determined as the rolled product progresses through the reversing unit;

comparing the measured variable with a reference value; and if the measured variable is equal to or less than the reference value, operating the reversing unit with an aim of achieving the target thickness of the rolled product.

2. The method as claimed in claim 1, wherein when the head end of the rolled product is rolled in the reversing unit, a force applied by the reversing unit is regulated to correspond with a pre-determined force pattern.

3. The method as claimed in claim 2, wherein the pre-determined force pattern comprises a constant force of between 5 MN and 100 MN.

4. The method as claimed in claim 2, wherein the pre-determined force pattern comprises a constant force of between 5 MN and 60 MN.

5. The method as claimed in claim 1, wherein
when the head end of the rolled product is rolled, a force applied by the reversing unit is regulated based on a reference force, and
the reference force is determined for the reversing unit from the measured variable.

6. The method as claimed in claim 1, wherein
the rolled product has a cold section comprising the head end of the rolled product,
the cold section of the rolled product has a predetermined expected minimum length, and
during rolling of the cold section of the rolled product in a region of the minimum length, the target thickness is ignored and the measured variable is not determined.

7. The method as claimed in claim 1, wherein
the rolled product has a cold section comprising the head end of the rolled product,
the cold section of the rolled product has a predetermined expected maximum length, a predetermined expected minimum length and a transition region between the minimum length and the maximum length, and
wherein the measured variable is determined and compared with a reference value only while rolling the rolled product in the transition region.

8. The method as claimed in claim 7, wherein
after the maximum length has passed through the reversing unit, the reversing unit is automatically switched over to closed-loop control with the aim of achieving the target thickness.

9. The method as claimed in claim 1, wherein
a rolled section of the rolled product is a section currently being rolled by the reversing unit, and
the current thickness of the rolled section of the rolled product is calculated based on a measured rolling force and a measured setting of a roll gap of the reversing unit.

10. The method as claimed in claim 1, wherein
the rolled product has first cold section at the head end of the rolled product,
the rolled product has second cold section at a foot end of the rolled product, between the cold sections, the reversing unit is operated with a closed-loop control with the aim of achieving the target thickness, and at the second cold section in foot end of the rolled product, the reversing unit is switched to a closed-loop control in which the target thickness is ignored.

11. The method as claimed in claim 6,
wherein the minimum length is between 0 m and 5 m.

12. The method as claimed in claim 7,
wherein the maximum length is approximately 10 m.

13. The method as claimed in claim 7, wherein the maximum length corresponds to a separation distance between the reversing unit and one of the winding furnaces.

14. The method as claimed in claim 1, wherein if there is a fault in the rolling process while operating the reversing unit with the aim of achieving the target thickness, then:

rolling conditions are switched such that the target thickness of the rolled product is ignored;

the measured variable is determined and compared with the reference value; and if the measured variable again becomes equal to or less than the reference value, the reversing unit again is operated with an aim of achieving the target thickness of the rolled product.

15. The method as claimed in claim 1, wherein
the rolled product has a cold section comprising the head end of the rolled product, and
the cold section has passed the reversing unit when the measured variable becomes equal to or less than the reference value.

16. An open-loop and/or closed-loop control device for a Steckel mill with a machine-readable program code which has control instructions which, on execution of the program code, cause the open-loop and/or closed-loop control device to carry out a method as claimed in claim 1.

17. A Steckel mill comprising:
a reversing unit for rolling a rolled product;
winding furnaces for the rolled product arranged respectively at an entry side and an exit side with respect to the reversing unit; and
an open-loop and/or closed-loop control device to:
ignore a target thickness of the rolled product, during rolling of the rolled product in the reversing unit, in a region of a head end of the rolled product;
determine a measured variable which correlates to at least one of a current thickness and a current hardness of the rolled product, the measured variable being determined while rolling the rolled product and ignoring the target thickness, the measured variable being determined as the rolled product progresses through the reversing unit;
compare the measured variable with a reference value; and
operate the reversing unit with an aim of achieving the target thickness of the rolled product if the measured variable is equal to or less than the reference value.

18. A non-transitory computer readable storage medium storing a computer program, which when executed by a processor, causes the processor to perform a method for operating a Steckel mill having a reversing unit for rolling a rolled product, the Steckel mill having winding furnaces for the rolled product, the winding furnaces including an entry-side winding furnace arranged at an entry side of the reversing unit, and an exit-side winding furnace arranged at an exit side of the reversing unit, the method comprising:
during rolling of the rolled product in the reversing unit, in a region of a head end of the rolled product, ignoring a target thickness of the rolled product;
while rolling the rolled product and ignoring the target thickness, determining a measured variable which correlates to at least one of a current thickness and a current hardness of the rolled product, the measured variable being determined as the rolled product progresses through the reversing unit;
comparing the measured variable with a reference value; and
if the measured variable is equal to or less than the reference value, operating the reversing unit with an aim of achieving the target thickness of the rolled product.

* * * * *